A. A. KOCH.
CORRUGATED CULVERT AND PROCESS OF PRODUCING SAME.
APPLICATION FILED MAR. 24, 1909.
946,919.
Patented Jan. 18, 1910.
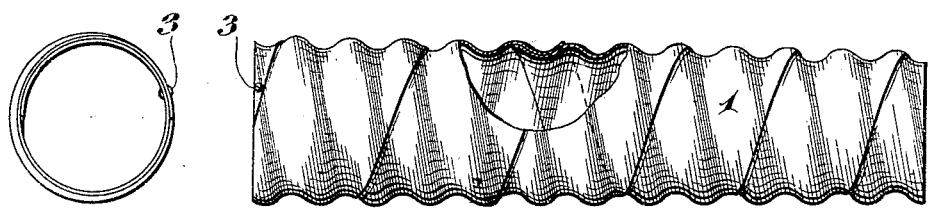
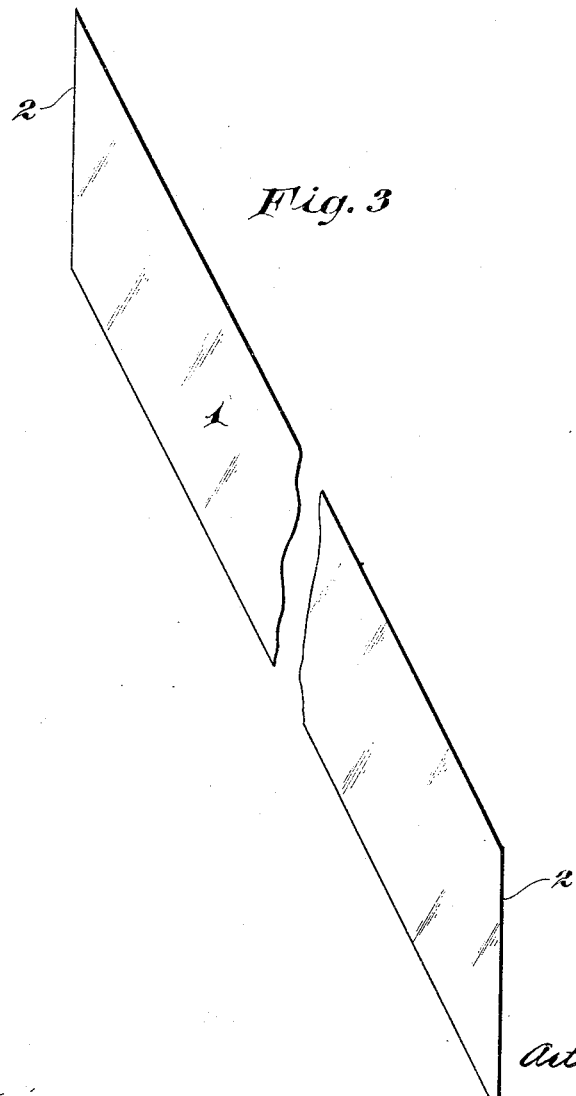

UNITED STATES PATENT OFFICE.

ARTHUR A. KOCH, OF ALBERT LEA, MINNESOTA.

CORRUGATED CULVERT AND PROCESS OF PRODUCING SAME.

946,919.

Specification of Letters Patent.

Patented Jan. 18, 1910.

Application filed March 24, 1909. Serial No. 485,371.

*To all whom it may concern:*

Be it known that I, ARTHUR A. KOCH, citizen of the United States, residing at Albert Lea, in the county of Freeborn and State of Minnesota, have invented certain new and useful Improvements in Corrugated Culverts and Processes of Producing Same; and I do hereby declare the following to be a full, clear, and exact description of the invention, such as will enable others skilled in the art to which it appertains to make and use the same.

My invention relates particularly to the provision of an improved corrugated cheap metal culvert pipe, but broadly has for its object to provide an improved cheap metal pipe or tube and process of producing the same.

To the above ends, the invention consists of the novel construction and arrangement of parts and mode of manipulation hereinafter described and defined in the claims.

The improved pipe or tube is made from a sheet metal strip, which is spirally wound in one direction to form the body of the pipe or tube and is formed with a spiral corrugation that runs in the other direction, so that the corrugations interlock and hold together with convolutions of the coiled strip.
In the accompanying drawings, which illustrate the invention, like characters indicate like parts throughout the several views.

Referring to the drawings, Figure 1 is a plan view, with some parts broken away, showing a pipe section constructed in accordance with my invention; Fig. 2 is an end elevation of the parts shown in Fig. 1; and Fig. 3 is a plan view, with parts broken away, showing the blank strip of sheet metal from which the pipe section is formed.

The sheet metal strip 1, from which the body of the pipe section is formed, has beveled ends 2 cut at the proper angle to form the ends of the tube with true edges lying in a plane in a right angle to the axis of the pipe. The strip 1 is spirally wound or coiled with lap joints and preferably with a lefthand tread and, after it is wound to form the body of the pipe section, the pipe section is formed with a righthand spiral corrugation. This righthand corrugation repeatedly intersects the coils of the strip 1 and thus serves to interlock the said coils, so that they will resist longitudinal strains both under compression and tension and will thus prevent the pipe section from being either shortened or lengthened by any ordinary strains to which the same will be subjected in use. Preferably, the pipe sections thus formed are tapered slightly so that the corrugated small end of one section may be screwed into the corrugated large end of another section, as shown in Fig. 1. That end of the coiled strip 1 which is the last to be bent and, hence, is at the outside thereof, is preferably secured by a single rivet 3 passed therethrough and through the overlapped portion of the strip 1.

The pipe section or tube constructed in the above manner will have very great strength and will be especially strong in its ability to resist crushing strains. It is, therefore, especially adapted for use as a culvert or drain pipe and may, as is evident, be made in any desired diameter and of any desired length.

The process by which the above described pipe or tube section is made is substantially as follows: First, the blank strip is cut to proper length and width and with the proper bevel at its ends. Then this strip is wound around a mandrel or form having a spiral groove or corrugation extending in a direction reverse to that of the direction in which the strip is wound thereon, and then the spiral groove in the pipe or tube section is formed by pressing the body thereof into the grooves or corrugations of the said mandrel. This latter step is preferably accomplished by the use of a lathe or similar machine in which the mandrel is revolved and in which a properly formed pressing tool, such as a roller, carried by the lathe carriage, is used to press the said corrugation into the pipe section. Of course, the strip may be first wound upon a smooth mandrel and the spirally corrugated mandrel thereafter inserted into the tube before the spiral corrugation is formed in the pipe section, but this would be an additional and unnecessary operation.

What I claim is:

1. A pipe or tube made of a sheet of metal spirally wound in one direction and having a spiral corrugation that extends in the other direction.

2. A pipe or tube made of a strip of sheet metal spirally coiled in one direction and having its outer end riveted to a body portion of said strip at one end of the said pipe or tube.

3. A pipe or tube section made of a strip of sheet metal having beveled ends, spirally wound in one direction and having a spiral corrugation that extends in the other direction.

4. A pipe or tube made of a strip of sheet metal spirally wound in one direction and having a spiral corrugation that extends in the other direction of the said pipe or tube, being tapered from one end toward the other.

5. The process of making pipes or tubes which consists first,—in spirally coiling a sheet metal strip in one direction, and, second,—in forming therein a spiral corrugation that extends in the other direction.

In testimony whereof I affix my signature in presence of two witnesses.

ARTHUR A. KOCH.

Witnesses:
ANNA S. FRYDENLUND,
CHARLES E. PAULSON.